US012049960B2

(12) United States Patent
Cvjetkovic

(10) Patent No.: US 12,049,960 B2
(45) Date of Patent: Jul. 30, 2024

(54) PISTON—CRANKSHAFT CONNECTING MEANS FOR INTERNAL COMBUSTION ENGINE

(71) Applicant: Zoran Cvjetkovic, Knin (HR)

(72) Inventor: Zoran Cvjetkovic, Knin (HR)

(73) Assignee: Zoran Cvjetkovic, Knin (HR)

( * ) Notice: Subject to any disclaimer, the term of this patent is extended or adjusted under 35 U.S.C. 154(b) by 0 days.

(21) Appl. No.: 17/941,041

(22) Filed: Sep. 9, 2022

(65) Prior Publication Data
US 2023/0020739 A1  Jan. 19, 2023

Related U.S. Application Data

(63) Continuation of application No. PCT/EP2020/056403, filed on Mar. 10, 2020.

(51) Int. Cl.
*F16J 1/16* (2006.01)
*F02B 75/04* (2006.01)
*F16J 1/08* (2006.01)

(52) U.S. Cl.
CPC .............. *F16J 1/16* (2013.01); *F02B 75/045* (2013.01); *F16J 1/08* (2013.01)

(58) Field of Classification Search
CPC .... F16J 1/16; F16J 1/08; F02B 75/045; Y10T 74/18208
USPC .......................................................... 74/43
See application file for complete search history.

(56) References Cited

U.S. PATENT DOCUMENTS

| 5,245,962 A * | 9/1993 | Routery ............... F02B 41/04 74/579 E |
| 7,028,647 B2 * | 4/2006 | Styron ............... F02B 75/045 123/48 B |
| 9,567,901 B2 | 2/2017 | Schulze et al. |
| 10,125,680 B2 | 11/2018 | Bay |
| 2014/0096747 A1 | 4/2014 | Woo et al. |

(Continued)

FOREIGN PATENT DOCUMENTS

| DE | 102018122117 B3 | 12/2019 |
| EP | 3237735 B1 | 5/2018 |
| WO | 2006/004612 A2 | 1/2006 |

OTHER PUBLICATIONS

International Search Report and Written Opinion mailed on Oct. 2, 2020, received for PCT Application PCT/EP2020/056403, filed on Mar. 10, 2020, 10 pages.

*Primary Examiner* — Kenneth Bomberg
*Assistant Examiner* — Daniel S Collins
(74) *Attorney, Agent, or Firm* — XSENSUS LLP

(57) ABSTRACT

A piston-crankshaft connector for an internal combustion engine can comprise a main connecting rod connected with its big end bore to a crankpin and at least one auxiliary connecting rod connected to off-axial surfaces made on the crankpin. On the piston side, the at least one auxiliary connecting rod can be attached to an upper crankpin nested within the main connecting rod, where the crankpin carries off-centred piston pin bore. Such construction can modify a piston pin bore distance relative to a main journal central axis during their rotation, which can improve the internal combustion stroke-to-stroke performance. A compression ratio can additionally or alternatively be adjusted by hydraulics acting on an entire segmented eccentric ring relative position within connecting rod bearing space via crankpin oil channels.

7 Claims, 13 Drawing Sheets

(56) References Cited

U.S. PATENT DOCUMENTS

2017/0114826 A1 4/2017 Pienta
2018/0106190 A1 4/2018 Bay

* cited by examiner

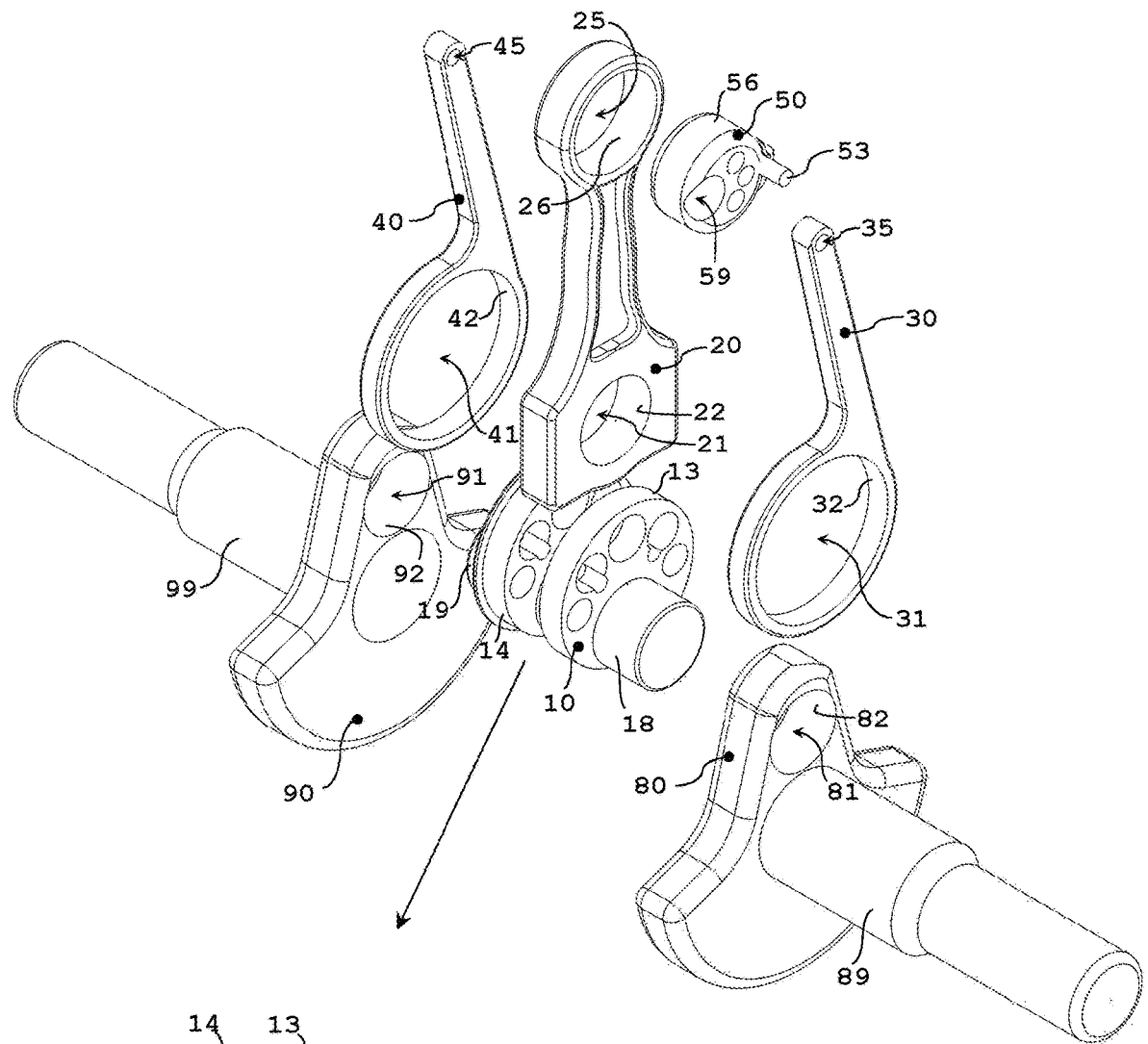
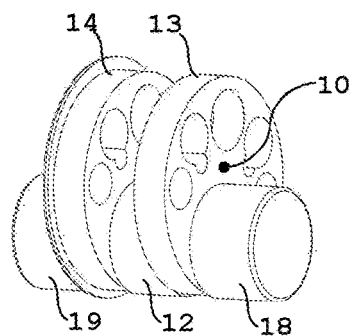
Figure 2
Figure 3

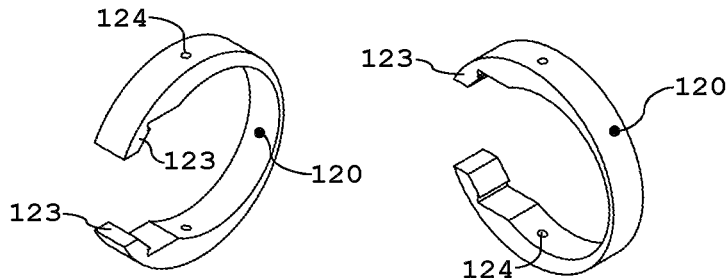
Figure 10A    Figure 10B
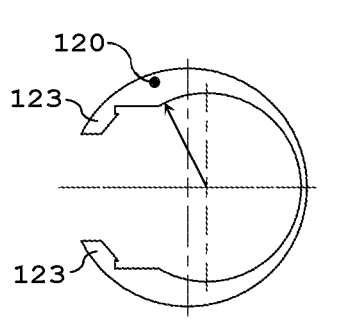    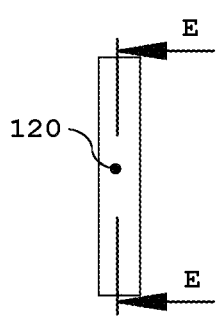    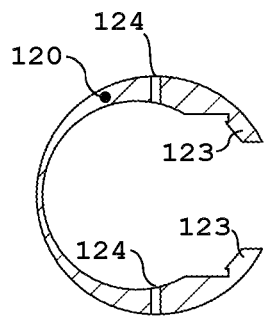
Figure 10C    Figure 10D    Figure 10E
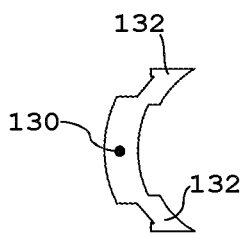    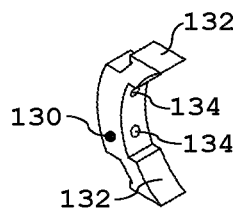    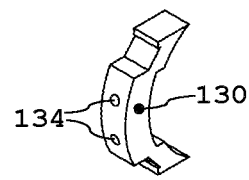
Figure 11A    Figure 11B    Figure 11C
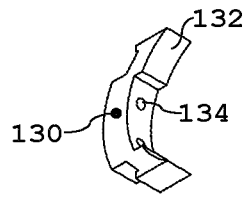    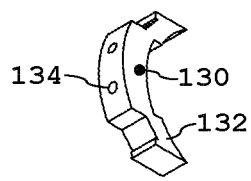
Figure 11D    Figure 11E

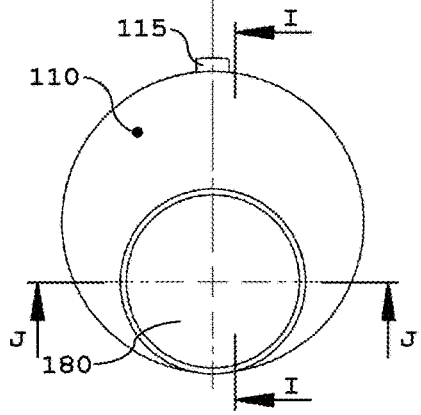
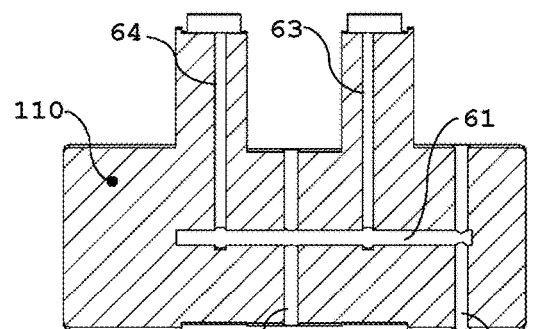
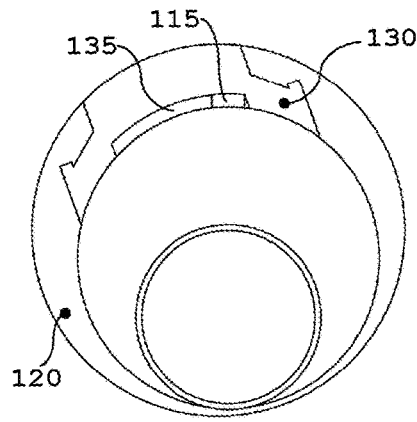
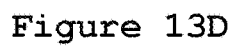
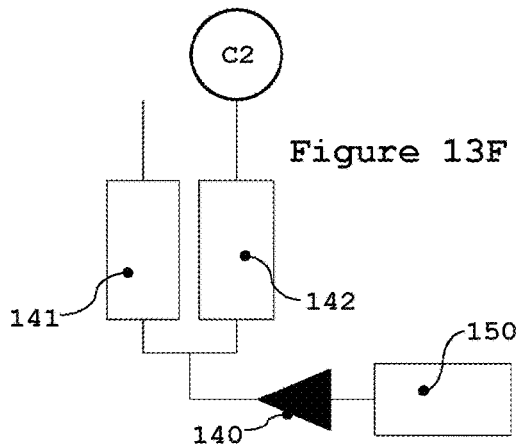
Figure 13A
Figure 13B
Figure 13C
Figure 13D
Figure 13E
Figure 13F

PISTON—CRANKSHAFT CONNECTING MEANS FOR INTERNAL COMBUSTION ENGINE

CROSS-REFERENCE TO RELATED APPLICATION

This application is a continuation of International Application No. PCT/EP2020/056403 filed Mar. 10, 2020, the entire contents of which are incorporated herein by reference.

FIELD

The present disclose relates to a piston-crankshaft connector for an internal combustion engine and systems and assemblies thereof. The corresponding technical field may be the field of internal-combustion piston engines, where the engines are characterised by their connection between the piston and main shafts, e.g., a crankshaft.

PRIOR ART

US granted patent U.S. Pat. No. 10,125,680 for APPARATUS TO OPTIMIZE COMPRESSION, which is filed in the name of Adam G. Bay. The document, according to the abstract, describes an internal combustion engine with dual, independently configured, connecting rods for each piston, which together may maintain higher compression at calculated crank angles during the expansion cycles. The independently expanding connecting rods are described as being rotatably attached by the rod's first end and to two adjacent crankpin sections with one crankpin section having radially and axially variable axis. The two rod's second ends are described as being pivotably attached to the lower two pins of the variably dimensioned three pin connecting element supporting the piston at the upper pivot pin, enabling the piston top to descend at a calculated, variable rate.

The European patent EP 3237735 B1 for VARIABLE LENGTH CONNECTING ROD AND VARIABLE COMPRESSION RATIO INTERNAL COMBUSTION ENGINE, filed in the name of Toyota Jidosha Kabushiki Kaisha, JP, describes a mechanism where an eccentric member is provided at a small diameter end of the connecting rod body. The eccentric member rotates such that an effective length of the variable length connecting rod is varied. The switching mechanism includes a hydraulic piston connected to the eccentric member.

US granted patent U.S. Pat. No. 9,567,901 for INTERNAL COMBUSTION ENGINE AND CONNECTING ROD, filed in the name of Hilite Germany GmbH, DE and Dr. Ing. h. c. F. Porsche AG, DE; and the US granted patent published as U.S. Pat. No. 10,100,725 for CONNECTING ROD FOR INTERNAL COMBUSTION ENGINE WITH VARIABLE COMPRESSION ECCENTRICAL ELEMENT ADJUSTMENT DEVICE, filed in the name of ECO Holding 1 GmbH, DE, are understood to solve the same technical problem as the '735 patent. Generally, differences among the documents may be viewed in terms of the driving parts of the upper eccentric member.

SUMMARY

Embodiments of the present disclosure involve a new piston-crankshaft connector for an internal combustion engine. The piston-crankshaft connector can be comprised or can consist of:

- a crankpin that is firmly nested, by the pair of pins, into the counterweights associated with the respective main journals; where the said crankpin and the said main journals are equipped with the plurality of oil channels;
- a main connecting rod;
- at least one auxiliary connecting rod, each optionally equipped with segmented eccentric ring, and
- an upper crankpin.

The crankpin may be further equipped with the axially positioned crankpin journal to which the main connecting rod is pivotably attached with its big end bore. The crankpin can have one or more off-axial crankpin journals to which the auxiliary connecting rod(s) are pivotably fastened via corresponding bearings.

The upper crankpin can be nested within the small end bore formed in the main connecting rod and can form a sliding bearing with the bore. The upper crankpin can be equipped with the off-centre piston pin bore and at least one sliding pin, which can be positioned a predefined distance from the upper crankpin rim, to which the auxiliary connecting rod(s) can be pivotably fastened. The auxiliary connecting rod(s) can continuously modify the piston pin bore distance relative to the crankpin journal central axis during its rotation in each stroke of the internal combustion engine.

The crankpin can be further equipped with at least one delimiter, for instance, formed as a tooth on at least one off-axial crankpin journal. At least a pair of oil channels can extend from the crankpin interior to the off-axial crankpin journal outer surface in a way that the oil channel pair ends a predetermined distance from the delimiter(s). The delimiter(s) can be situated beneath the driving segment of the segmented eccentric ring. The segmented eccentric ring can be composed from the C-shaped segment and the driving segment. The oil pressure exerted in one or more oil channels can rotate a desired segmented eccentric ring over one or more off-axial crankpin journals to modify the top dead centre sliding pin position within the small end bore. This action can simultaneously modify the piston pin bore position within the main connecting rod to change the compression ratio of the internal combustion engine.

In one variant two auxiliary connecting rods can be linked with the crankpin together with the main connecting rod situated between the two auxiliary connecting rods, for instance, in order to distribute exerted forces to the upper crankpin evenly.

In yet one variant, the segmented eccentric ring can be composed of the C-shaped segment and the driving segment, where both can be equipped with the oil channels and mutually connected via snap connectors formed at their respective ends.

One or more embodiments of the disclosed subject matter can also involve a method for regulating the compression ratio of an internal combustion engine by using a piston-crankshaft connector, also according to one or more embodiments of the disclosed subject matter. The oil pump can pump the oil from an oil reservoir through one of two oil channels made through the crankshaft. The channel pair can extend through each main journal and each crankpin, forming two longitudinal channels. The oil pressure exerted by the pump can be further transmitted by a group of lateral oil channels connected to the first longitudinal channel, or can be transmitted by a group of lateral oil channels connected to the second longitudinal channel. Each group of channels can end on the off-axial crankpin surface a predetermined distance from the corresponding delimiter's side. Each delimiter can divide the expansion space formed beneath the corresponding driving segment. The later oil injection into the expansion space, via one group of channels, can rotate the entire segmented eccentric ring relative over the off-axial crankpin's outer surface in a desired direction. This action can modify the top dead centre sliding pin position within the small end bore and simultaneously can modify the piston pin bore position within the main connecting rod which can change the compression ratio of the internal combustion engine.

A BRIEF DESCRIPTION OF THE FIGURES

FIG. 2 shows the exploded view of the second embodiment depicted in FIG. 1.

FIG. 3 shows the crankpin from FIG. 2.

FIG. 6A shows the front side projection of the first embodiment crankpin, while A-A denotes the corresponding cross section depicted in FIG. 6B.

FIGS. 10A-10E depict the C-shaped segment in various perspectives, while E-E cross section is depicted in FIG. 10E.

FIGS. 11A-11E depict the driving segment in various perspectives.

FIGS. 13A-13F show the first embodiment's method for changing the compression ratio by rotating the C-shaped segment and driving segment over the off-axial crankpin journal, in the direction opposite to those depicted in FIGS. 12A-12F, by applying the oil pressure across C2 channel.

FIGS. 15A-15I show side-by-side simulation of one working cycle among the prior art solution disclosed in U.S. Pat. No. 10,125,680 (left), the second embodiment of the disclosed invention (centre) and standard piston rod connected to the standard crankpin and cylinder (right). Said Figs. denotes crankshaft rotation, measured ad TDC, at 0°, 450, 90°, 1350, 180°, 225°, 270°, 315° and 360°.

Figure 15A:
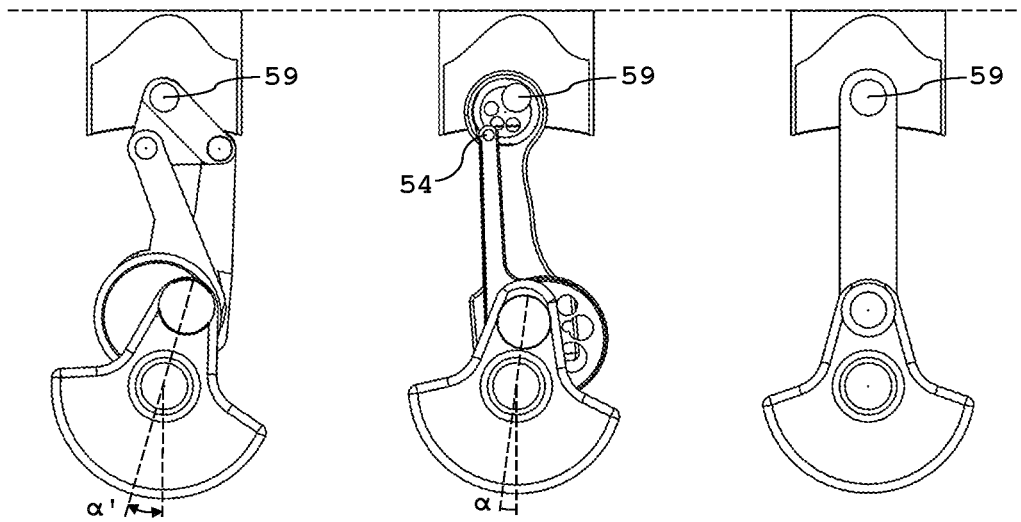
Figure 15B:
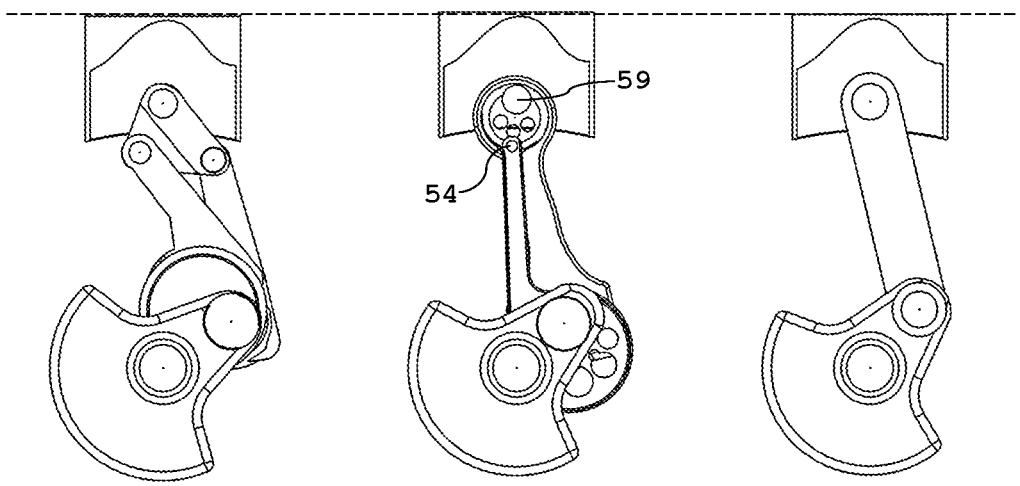
Figure 15C:
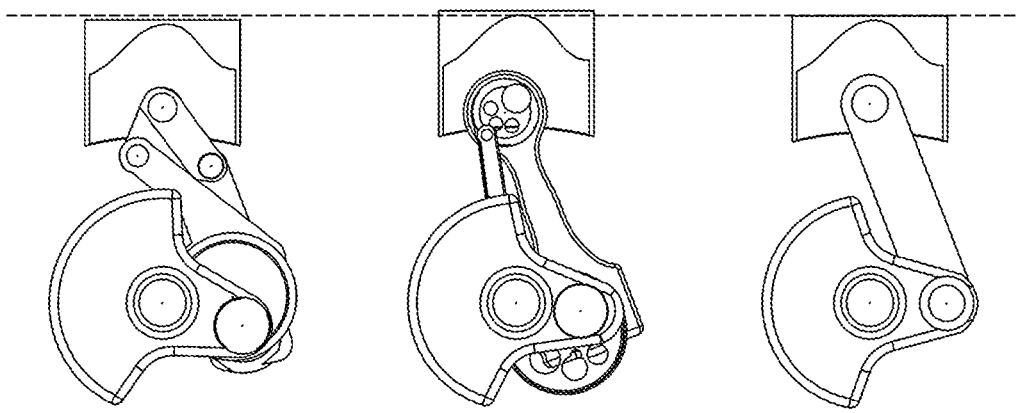
Figure 15D:
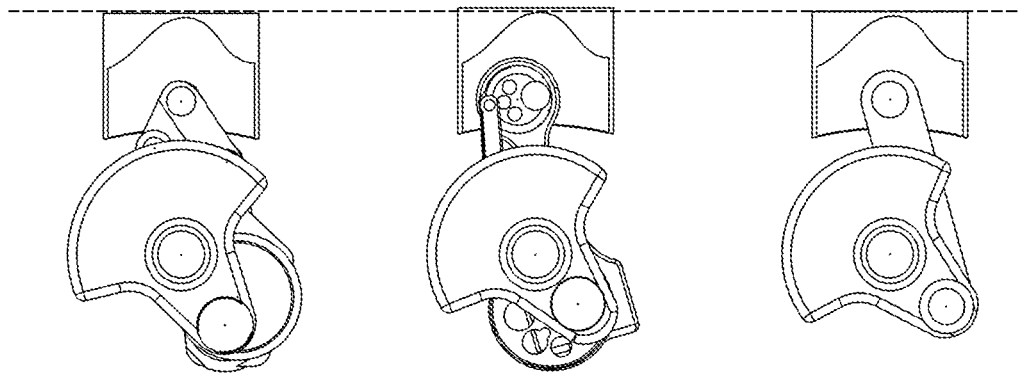
Figure 15E:
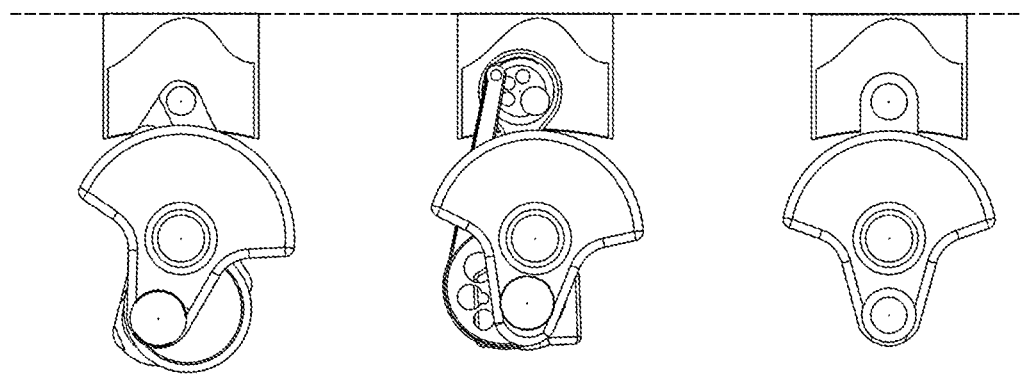
Figure 15F:
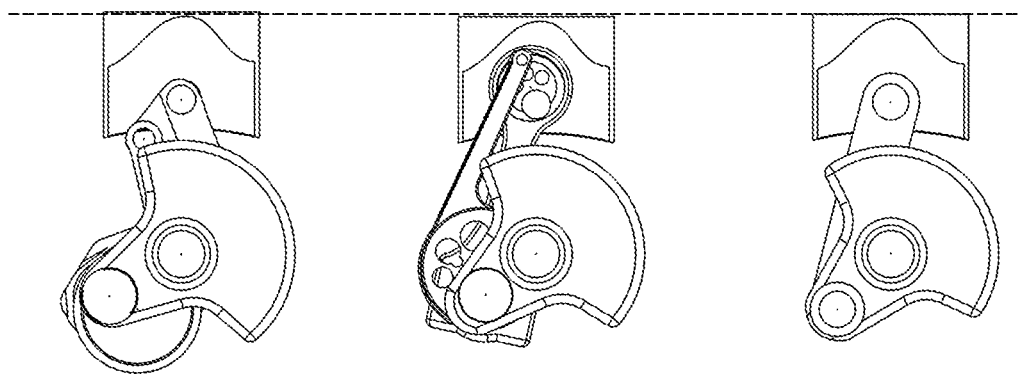
Figure 15G:
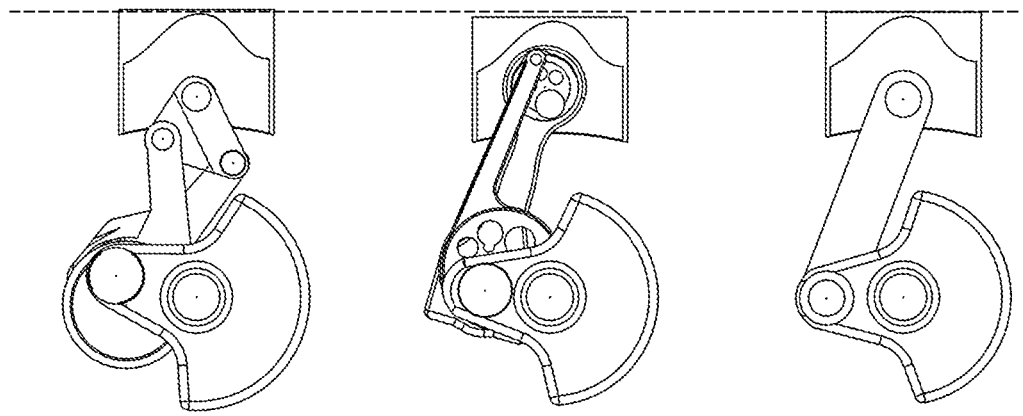
Figure 15H:
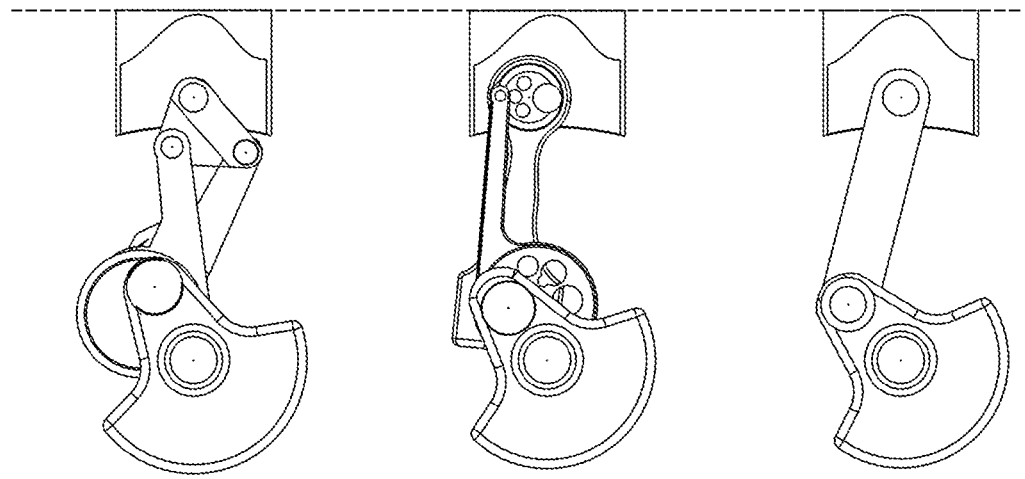
Figure 15I:
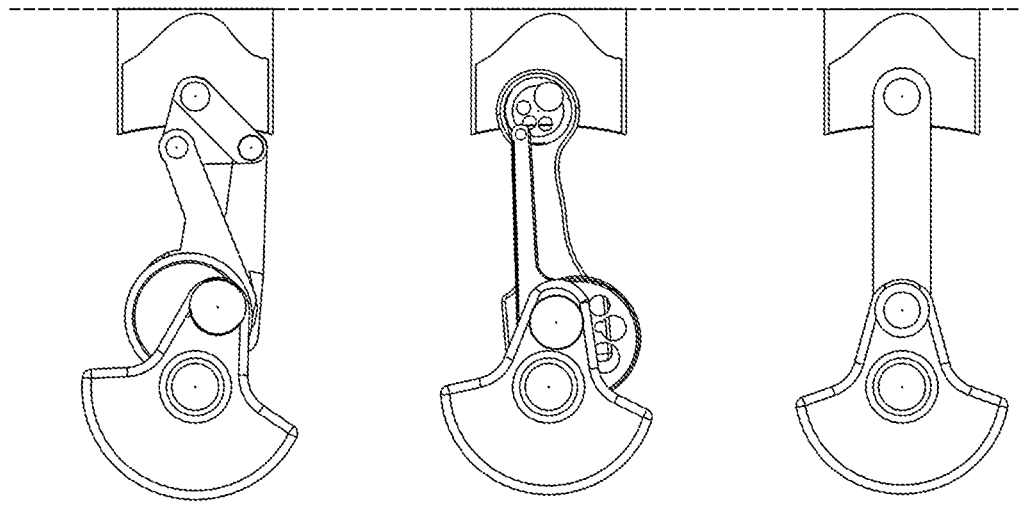
Figure 16:
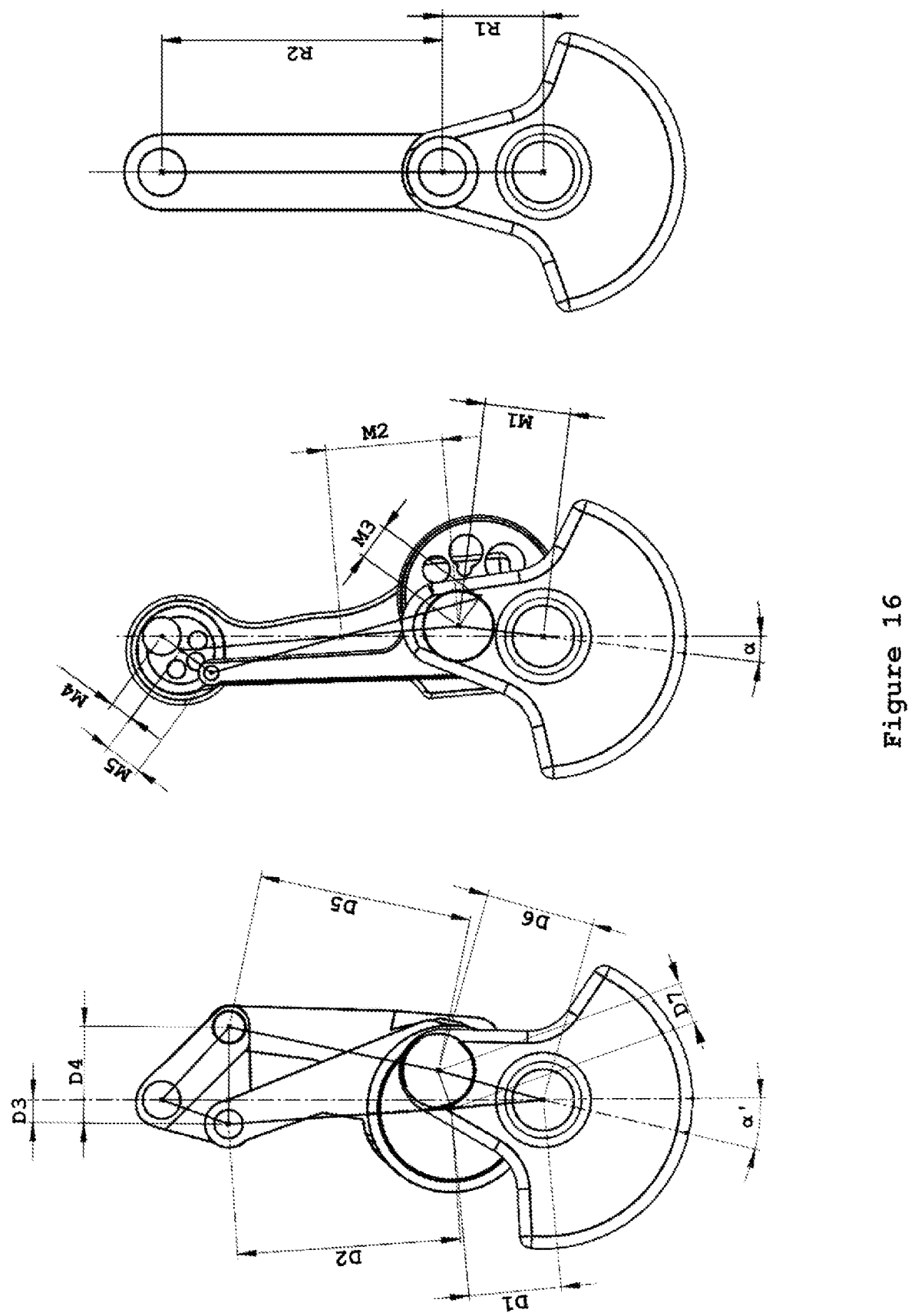

FIG. 16 shows the dimensions used in CAD modelling of three competing solutions represented in FIGS. 15A-15I; the prior art solution disclosed in U.S. Pat. No. 10,125,680 (left), the second embodiment of the disclosed invention (centre) and standard piston rod connected to the standard crankpin (right).

DETAILED DESCRIPTION

Practical internal combustion engines and the corresponding working cycles are well-known in the art for more than 150 years. From the beginning, numerous attempts to improve the motor efficiency have been made. The standard and simple mechanical connection, e.g. "piston-connecting rod-crankshaft," has been widely used despite the TDC (top dead centre) and BDC (bottom dead centre) problems with the momentum transfer from the piston's reciprocating motion to the engine crankshaft. In general, the solution was sought in a way to improve "crankshaft—connecting rod" connection and in rare cases with further modification of the "connecting rod—piston" connection. Usually said improvements involve mechanical solutions that may not be durable for long term usage, or which may be too costly, and which finally may override the benefits from solving the observed TDC/BDC moment transfer problems.

The present disclosure relates to an improvement piston-crankshaft connector for an internal combustion engine. According to one or more embodiments of the disclosed subject matter, a piston-crankshaft connector can be composed by or consist of two or more connecting rods, which may act as an adjustable connector that can modify piston movement during each stroke. The adjustable connector may additionally allow a compression ratio to be changed in addition to already altered piston movement. Having in mind the complexity of the preferred embodiment depicted in FIG. 4 and other Figs, we will start by describing the solution that is designed to improve efficiency of the internal combustion engine working cycle only—by alleviating problems of a piston reciprocating motion conversion into crankshaft's rotary motion present in TDC/BDC.

A first technical problem, solved by one or more embodiments the present disclosure, is directed to the modification of reciprocating piston motion in time. The standard sinusoidal piston motion, when depicted in a form of a 2D graph piston position vs. time, is modified to slow down the piston "dive" across the cylinder after the TDC. That modification results with a greater torque transfer on the crankshaft in comparison with the conventional [piston-connecting rod-crankshaft] mechanical connection. That modification is achieved by one or more auxiliary connecting rods that cooperate with the crankpin and the main connecting rod, specifically connecting the piston via another crankpin formed within the connection rod small end bore. It is worth to note that each piston stroke is modified in an equal manner.

The second technical problem, solved by the present invention, is the ability to variate a compression rate of the internal combustion engine during the normal operation, in addition to all benefits already achieved by solving the first technical problem. This problem is solved by externally controlling a position of previously mentioned auxiliary connecting rods relative to the main connecting rod. The said external control is provided via set of oil channels and by changing the oil pressure therein. The oil pressure regulates the TDC piston position, more precisely, the piston pin bore distance relative to the modified crankpin according to the said invention.

According to one or more embodiments of the present disclosure, instead of connecting cam used in the above-discussed '680 patent, an entirely new bearing mechanism can be nested into the main connecting rod that can further improve working cycle. Simulations shown in FIGS. 15A-15I compare side-by-side the '680 patent, embodiment(s) of the present disclosure, and a so-called "standard" motor during one working cycle. It is also noted that the '680 patent is silent regarding the ability to change the compression rate simultaneously with the mentioned improvement of the working cycle.

Figure 1:
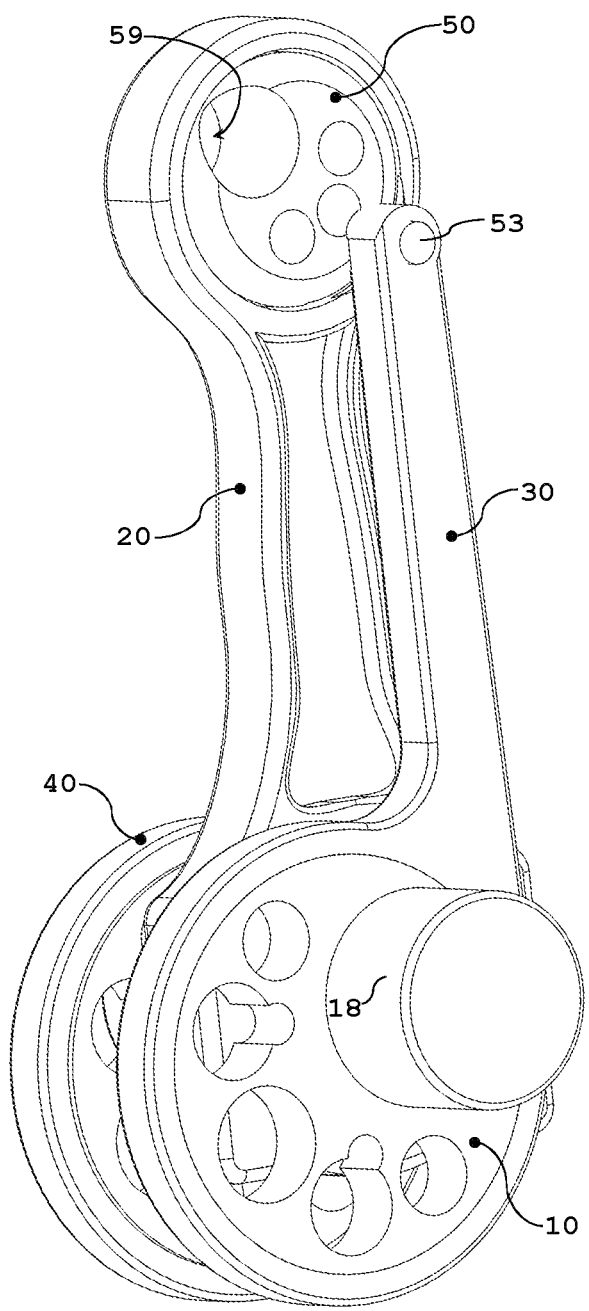
FIG. 1 shows the second embodiment which is capable to continuously modify the piston pin bore distance relative to the crankpin journal.

A Solution of the 1st Technical Problem According to Embodiments of the Disclosed Subject Matter FIG. 1 shows an embodiment which is capable to continuously modify a piston pin bore (59) distance relative to a crankpin (10) and a corresponding crankpin journal (12) (see FIG. 3) during the crankpin (10) rotation. FIG. 2 depicts an exploded view of a piston-crankshaft connector, which may be referred to herein as a connecting means, while FIG. 3 depicts the crankpin (10) according to one or more embodiments of the present disclosure.

According to one or more embodiments of the present disclosure, the piston-crankshaft connector, which can be for an internal combustion engine, can comprise or consist of the crankpin (10), a main connecting rod (20), at least one auxiliary connecting rod (30, 40), and an upper crankpin (50), such as shown in FIG. 1 and FIG. 2.

The crankpin (10) may be equipped with one or more off-axial crankpin journals (13, 14). As the name suggests, the off-axial crankpin journals (13, 14) can be disk-shaped journals with a diameter which is equal or greater to the crankpin journal (12) diameter, for instance. Their principal axes may not coincide with the crankpin axis, as depicted in FIG. 3, and can be positioned in parallel to the crankpin journal (12) axis. The crankpin (10) can have two pins, a right pin (18) and a left pin (19), where the pins (18, 19) can be nested within corresponding right and left counterweights (80, 90). The right pin (18) can be nested within the right pin nest (81) and clenched by the right pin receiving surface (82). Equally, the left pin (19) can be nested within the left pin nest (91) and clenched by the left pin receiving surface (92). The main journals (89, 99) can extend from the centre of corresponding counterweights (80, 90), such as shown in FIG. 2.

The main connecting rod (20) can have a big end bore (21) and an enlarged small end bore (25) which function will be explained in more detail later. The main connecting rod (20) can be connected with the crankpin (10) via big end bore (21). From FIG. 2 it can be appreciated that the lower part of connecting rod (20) can (e.g., should) be formed in two parts to enclose the crankpin journal (12), for instance, by using so called rod cap technique. These parts, the rod cap and the main rod, can be fastened together via corresponding pair of bolts and nuts, for instance, by simultaneously inserting bearing insets, denoted hereby as the big end bearing (22), which role can be to form a sliding bearing between crankpin (10) and the main connecting rod (20). On the opposite side, instead of a conventional small end bore for receiving the piston pin, the enlarged small end bore (25) cam be formed. The enlarged small end bore (25) can have one or more sliding insets which can form the small end bearing (26). The small end bearing (26) can receive the upper crankpin (50) in a way that the upper crankpin (50) is slidably nested within it. Therefore, the upper crankpin journal (56) is able to slide, i.e., rotate, within the small end bearing (26).

Regarding the above-mentioned first technical problem, the upper crankpin (50) can be equipped with the piston pin bore (59) which can be formed off-centre within the upper crankpin (50), such as shown in FIG. 2, and with one or more sliding pins (53, 54) positioned relatively close to the upper crankpin (50) rim. According to one or more embodiments, the sliding pins (53, 54) can be situated opposite to the piston pin bore (59), such as depicted in FIG. 2, but in general the sliding pins (53, 54) may not be situated at the same position, e.g., same radius line, with the piston pin bore (59). The sliding pins (53, 54) can be formed, due to the symmetry reasons, in the same upper crankpin rim position, extending in different direction. Any motion of the sliding pins (53, 54) can or will therefore produce the piston pin bore (59) movement, so any force generated on the sliding pins (53, 54) can or will be immediately transmitted to the piston pin bore (59) connected with the piston and vice versa—the piston force can be transmitted via the piston pin to piston pin bore (59).

The one or more auxiliary connecting rods (30, 40) can be used to additionally connect the crankpin (10) and the upper crankpin (50), such as shown in FIG. 2. Each auxiliary connecting rod (30, 40) can be shaped as a stylised number six, for instance; the bottom part can have a bearing space (31, 41) and the connecting rod bearing (32, 42) surface which diameter matches with the corresponding right and left off-axial crankpin journal (13, 14). In that manner each connecting rod (30, 40) can be pivotally connected with the corresponding off-axial crankpin journal (13, 14) in the bottom part. On the opposite side, each auxiliary connecting rod (30, 40) can have its own pin bearing (35, 45) to receive the corresponding sliding pin (53, 54) and can establish another pivotal connection with the upper crankpin (50).

A technical effect of the auxiliary connecting rods (30, 40) can be to lower and upper (i.e., lower and raise) piston pin bore (59) situated within the upper crankpin (50) continuously along with the rotation of the crankpin (10) around crankshaft axis. The later action notably can be a modification to a so-called "standard" piston motion, such as in a manner presented in FIGS. 15A-15I. According one or more embodiments of the present disclosure, presented by a central set of drawings, the piston can "dive" more slowly in time in comparison with the standard piston rod connection, depicted right, and as described in the '680 patent. The horizontal line in each picture depicts the upper piston position of an ordinary piston-crankshaft connection, while the prior art simulation was performed by using the geometrical data disclosed in the '680 patent.

All simulations can be (and were) animated and analysed by the 3D CAD Design Software SolidWorks. The FIGS. 15A-15I reveals differences in crankshaft rotation among these solutions, measured in TDC, i.e., 0°, 45°, 90°, 135°, 180°, 225°, 270°, 315° and 360°. The attention should be brought to the reader to inspect firstly position 0°, depicted in FIG. 15A, and to observe the relative crankshaft offset angle α depicted by dashed lines which should be added in all other drawings as well. The mentioned offset angle arises from the mechanical interaction of the auxiliary connecting rods and the piston pin bore according to embodiments of the disclosed subject matter that are different from the standard piston-crankshaft connection.

Table 1, depicted below, shows the simulation data for forces and torque calculated for different angles, taking into account the aforesaid offsets. The values, at least as far as one or more embodiments of the present disclosure are concerned, are merely examples and not necessarily representative of all values.

TABLE 1

| Angle [°] | F [N] '680 | F [N] Embodiment(s) of Present Disclosure | F [N] Standard | Torque [Nm] '680 | Torque [Nm] Embodiment(s) of Present Disclosure | Torque [Nm] Standard |
|---|---|---|---|---|---|---|
| 0.09 | 14896.15 | 14958.53 | 14964.82 | 0.00 | 0.00 | 0.00 |
| 4.89 | 13859.01 | 13928.77 | 13951.26 | 71.24 | 178.63 | 69.11 |
| 10.89 | 10770.10 | 11075.37 | 11005.07 | 115.27 | 181.60 | 113.19 |
| 15.69 | 8233.50 | 8691.73 | 8514.43 | 132.36 | 172.02 | 131.50 |
| 20.49 | 6194.59 | 6714.04 | 6492.82 | 125.31 | 150.34 | 126.43 |
| 25.29 | 4681.87 | 5198.00 | 4959.31 | 114.69 | 130.16 | 117.26 |
| 30.00 | 3584.75 | 4065.31 | 3831.96 | 99.27 | 109.96 | 102.87 |
| 34.89 | 2786.97 | 3219.61 | 3003.67 | 86.22 | 93.70 | 90.57 |
| 40.89 | 2077.25 | 2447.10 | 2258.34 | 70.29 | 75.92 | 75.14 |
| 45.69 | 1666.48 | 1988.70 | 1821.63 | 59.54 | 64.27 | 64.45 |
| 50.49 | 1352.06 | 1630.82 | 1484.78 | 50.49 | 54.57 | 55.37 |
| 55.29 | 1107.46 | 1347.59 | 1221.13 | 42.65 | 46.23 | 47.31 |
| 60.09 | 914.34 | 1120.75 | 1011.89 | 35.99 | 39.16 | 40.35 |
| 64.89 | 759.78 | 937.12 | 843.30 | 30.35 | 33.24 | 34.32 |
| 70.89 | 607.07 | 753.86 | 675.95 | 24.54 | 27.14 | 28.02 |
| 75.69 | 509.43 | 635.76 | 568.55 | 20.72 | 23.11 | 23.80 |
| 80.49 | 428.55 | 537.43 | 479.18 | 17.50 | 19.69 | 20.19 |
| 85.29 | 361.00 | 454.98 | 404.39 | 14.77 | 16.84 | 17.11 |
| 90.09 | 304.18 | 385.42 | 341.41 | 12.46 | 14.34 | 14.48 |
| 94.89 | 256.09 | 326.42 | 287.97 | 10.50 | 12.25 | 12.23 |
| 100.89 | 205.93 | 264.76 | 232.28 | 8.45 | 10.05 | 9.87 |
| 105.69 | 172.31 | 223.38 | 194.90 | 7.07 | 8.55 | 8.28 |
| 110.49 | 143.48 | 187.83 | 162.86 | 5.89 | 7.26 | 6.92 |
| 115.29 | 118.69 | 157.23 | 135.25 | 4.88 | 6.14 | 5.74 |
| 120.09 | 97.37 | 130.84 | 111.51 | 4.00 | 5.16 | 4.72 |

The "standard" stands for so-called "standard" engine construction.

The performed calculations are notably performed having in mind the complex force distribution from a piston bore, across the upper crankpin of one or more embodiments of the present disclosure, and finally across main connecting rod and one or more auxiliary connecting rods to the crankpin journals.

The following data sets {D1, D2, D3, D4, D6, D7}, {M1, M2, M3, M4, M5}, {R1, R2} and {α', α} in TDC (see FIG. 16) can be used to model the equal cylinders and pistons, e.g., internal combustion engines having identical maximum stroke and piston diameter. Table 2 depicts relevant data:

TABLE 2

| '680 Dim. | '680 [mm] | Embodiment(s) of Present Disclosure Dim. | Embodiment(s) of Present Disclosure [mm] | Standard Dim. | Standard [mm] |
|---|---|---|---|---|---|
| D1 | 39.03 | M1 | 36.00 | R1 | 42.50 |
| D2 | 94.06 | M2 | 49.40 | R2 | 118.30 |
| D3 | 10.18 | M3 | 15.00 | | |
| D4 | 41.00 | M4 | 16.00 | | |
| D5 | 90.00 | M5 | 10.03 | | |
| D6 | 46.00 | | | | |
| D7 | 17.00 | | | | |
| α' | 14.0° | α | 6.8° | α | 0.0° |

In all three internal combustion engines, e.g., corresponding models, the following data are used:

piston diameter was 82 mm, maximum stroke 85 mm, and, the TDC compression ratio was set to be 1:28.3.

Table 3 depicts the corresponding volume changes for the identical angles used in Table 1, i.e., for fixed {α', α}:

TABLE 3

| Angle [°] | Volume [mm³] '680 | Volume [mm³] Embodiment(s) of Present Disclosure | Volume [mm³] Standard |
|---|---|---|---|
| 0.09 | 15859.22 | 15823.45 | 15835.02 |
| 4.89 | 17002.47 | 16950.55 | 16943.47 |
| 10.89 | 21650.89 | 21118.82 | 21271.71 |
| 15.69 | 27919.08 | 26578.72 | 27130.67 |
| 20.49 | 36386.48 | 33836.76 | 34942.61 |
| 25.29 | 46951.20 | 42795.29 | 44707.54 |
| 30.00 | 59475.37 | 53348.05 | 56267.10 |
| 34.89 | 73788.12 | 65386.23 | 69462.95 |
| 40.89 | 93888.00 | 82363.24 | 88042.71 |
| 45.69 | 111460.99 | 97364.07 | 104405.57 |
| 50.49 | 130099.83 | 113503.47 | 121876.87 |
| 55.29 | 149555.24 | 130641.74 | 140245.49 |
| 60.09 | 169578.25 | 148613.97 | 159300.30 |
| 64.89 | 189927.32 | 167238.22 | 178882.94 |
| 70.89 | 215476.17 | 191145.24 | 203743.92 |
| 75.69 | 235752.18 | 210538.65 | 223696.05 |
| 80.49 | 255682.78 | 229967.44 | 243542.61 |
| 85.29 | 275107.07 | 249253.60 | 263072.47 |
| 90.09 | 293887.06 | 268231.22 | 282127.27 |
| 94.89 | 311906.99 | 286749.09 | 300601.46 |
| 100.89 | 333220.55 | 309046.60 | 322612.14 |
| 105.69 | 349213.24 | 326065.31 | 339291.70 |
| 110.49 | 364206.06 | 342252.91 | 355021.15 |
| 115.29 | 378160.52 | 357533.57 | 369800.50 |
| 120.09 | 391051.25 | 371848.44 | 383524.18 |

It is rather straightforward to calculate that initial TDC piston position can be ~3 mm from the top of the cylinder. Also, to convert the above volume data to cm³ the volume numbers should be divided by 1000. This helps in understanding the data more efficiently.

Furthermore, the forces which are calculated in the TDC can be based on the compression ratio 1:28.3 that gives inner pressure close to 28.3 Bar—which can yield the force exerted to the piston F=pressure×piston area, close to 16 kN.

From Table 3, one can observe that piston, according to one or more embodiments of the present disclosure, can "dive" slower, for instance, in comparison to the '680 patent and standard solution. From Table 1, the moment transfer for angles between 10°-40° in the case of embodiments of the disclosed subject matter can be better than in the other two compared solutions.

All the above said can be observed via set of FIGS. 15A-15C. The generated pressure within the cylinder can be better used, see FIG. 15C which represents the situation TDC+90°, e.g., the cylinder pressure is higher during the cycle interval when a momentum transfer can be better used, due to the mechanical construction according to embodiments of the present disclosure. After, the piston according to embodiments of the present disclosure can accelerate and catch again the standard working piston reciprocating movement before the BDC, see FIG. 15E. In a similar manner, the return from BDC to TDC can be somewhat slower, see FIG. 15G.

According to the data from Tables 1 and 3, the moment transfer in embodiments of the disclosed subject matter show a gain in comparison with the conventional solution and especially in comparison with the '680 patent solution. A Solution of the $2^{nd}$ Technical Problem According to One or More Embodiments of the Present Disclosure.

The second technical problem can be referred to or characterized as an upgrade to the first technical problem, for instance, in a way to enable outer (external) regulation of the compression. In contrast to the first technical problem where the piston pin bore (59) can be always changing its relative position within the main connecting rod (20), see FIGS. 15A-15I, the regulation of the compression can effectively mean that the TDC piston position can be adjusted according to the needs.

Figure 4:
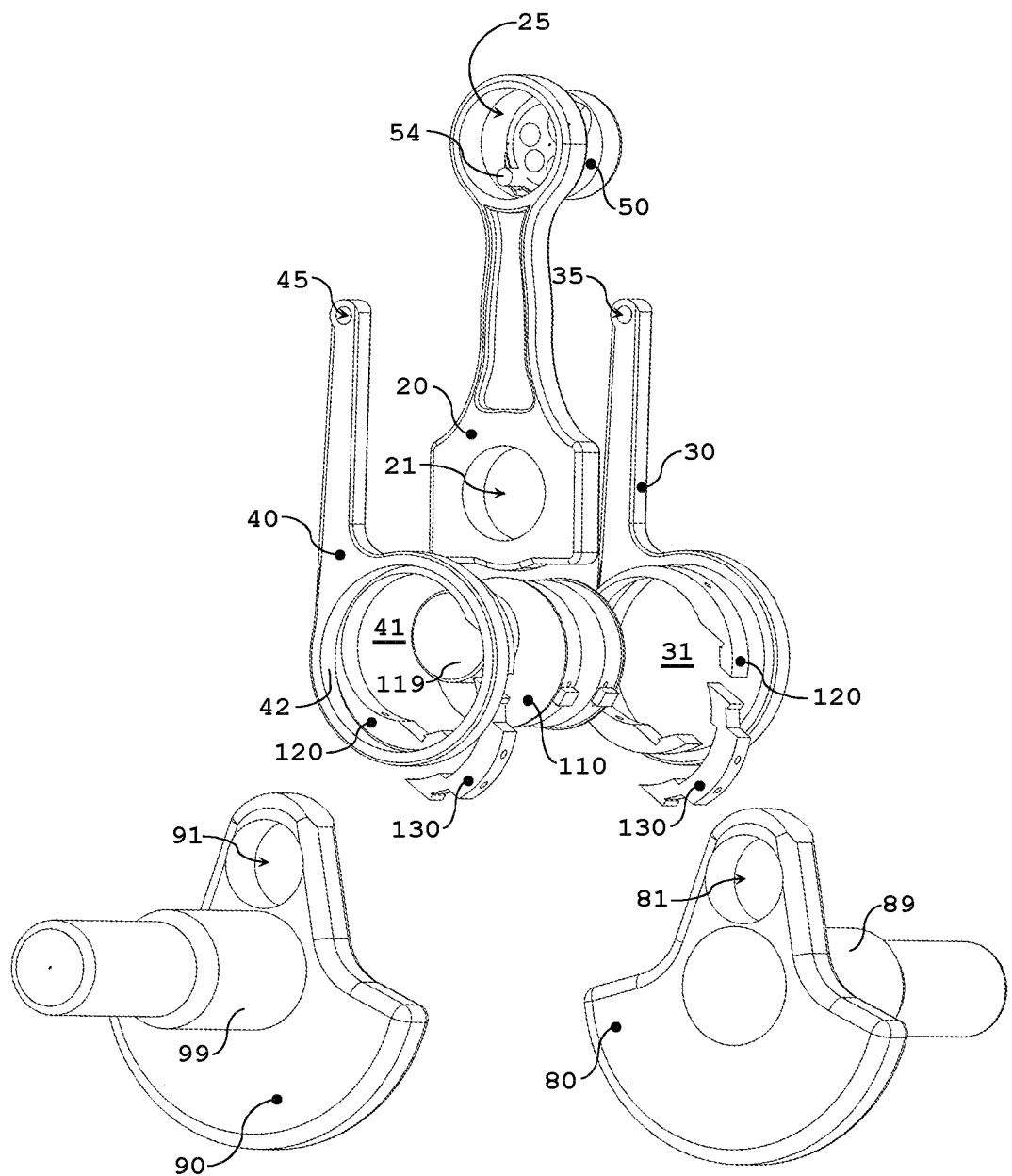
FIG. 4 shows the first embodiment, which is an upgrade to the second embodiment, in a way that is capable to change the compression ratio.

One embodiment of the present disclosure which has the ability to adjust the compression is depicted in FIG. 4. Here, a modification is made on the crankpin; the crankpin (10) may be now seen as being modified into the adjustable crankpin (110). Furthermore, two additional elements, e.g., C-shaped segment (120) and the driving segment (130) which can together form the segmented eccentric ring, have been added to the previous solution.

Figure 5A:
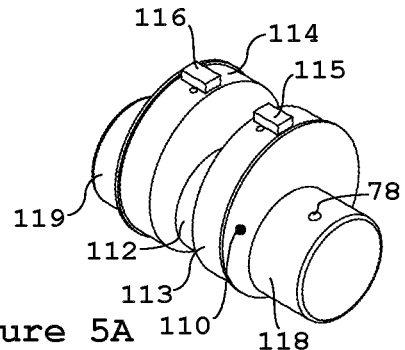
FIGS. 5A-5F show the first embodiment crankpin layout in various perspectives.
Figure 5B:
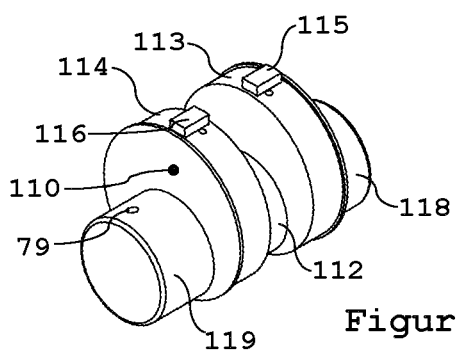
Figure 5C:
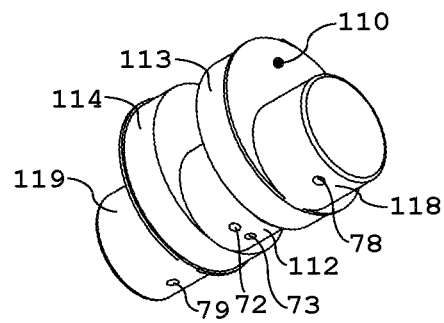
Figure 5D:
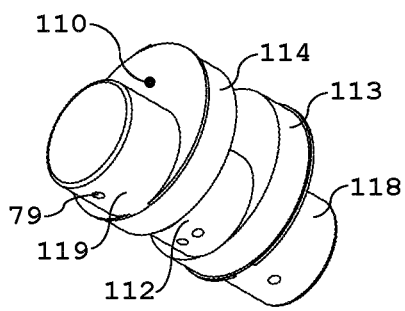
Figure 5E:
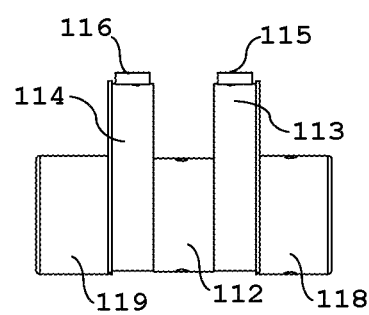
Figure 5F:
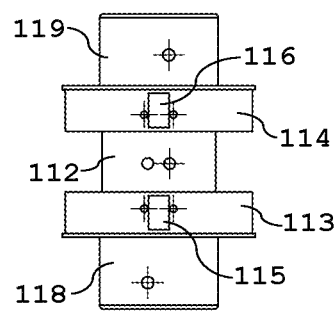
Figure 6A:
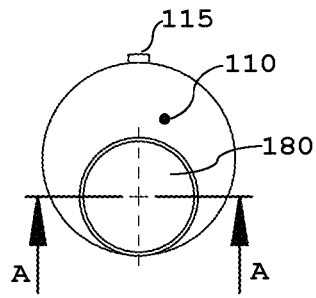
FIG. 6A shows the side projection of the first embodiment crankpin, while A-A denotes the corresponding cross section depicted in FIG. 6B.

The adjustable crankpin (110), according to this embodiment of the present disclosure, can be presented by the series of figures. FIGS. 5A-5F shows the crankpin (110) from various perspectives. The crankpin (110) can have a crankpin journal (112), one or more off-axial crankpin journals (113, 114), and a pair of pins (118, 119). The crankpin journal (112) can have the same technical function as previously described crankpin journal (12). The same can be true for the pins (118, 119) having the identical function as the pins (18, 19). A difference among the adjustable crankpin (110) and the crankpin (10) is that the off-axial crankpin journals (113, 114) can be equipped with delimiters (115, 116) situated on the surfaces of the said crankpin journals. Each of the delimiters (115, 116) can be formed as an upthrow, or a tooth, for instance, over the corresponding off-axial crankpin journal (113, 114) disk surface, such as depicted in FIGS. 5E, 5F, and 6A. The technical role of the delimiters (115, 116) will be studied in more details later.

The adjustable crankpin (110) may be referred to or characterized as complex body, for instance, considering the plurality of oil channels provided in it. Two types of channels can be made within the crankpin (110), a pair of longitudinal channels (61, 62) which can extend between the opposite pins (118, 119) and a plurality of lateral channels (63, 64, 65, 66, 72, 73, 78, 79) that can end at least by its one side on the crankpin's (110) outer surface.

Figure 6B:
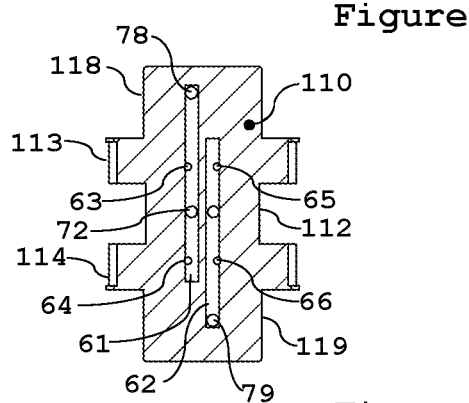
Figure 7A:
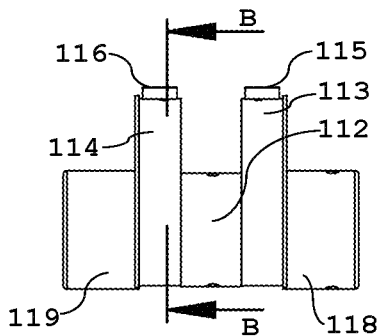
FIG. 7A shows the left side projection of the first embodiment crankpin, while B-B denotes the corresponding cross section depicted in FIG. 7B.
Figure 7B:
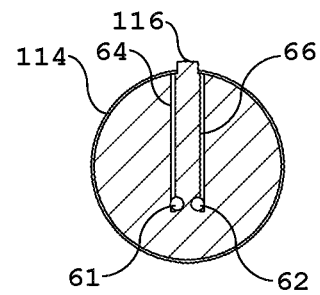
Figure 8A:
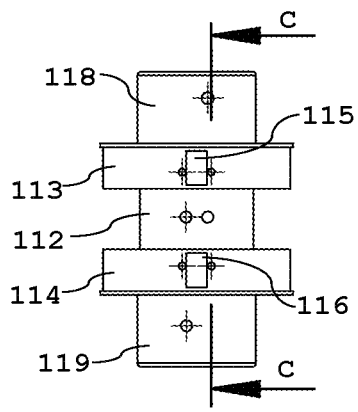
FIG. 8A shows top view of the first embodiment crankpin, while C-C denotes the corresponding cross section depicted in FIG. 8B.
Figure 8B:
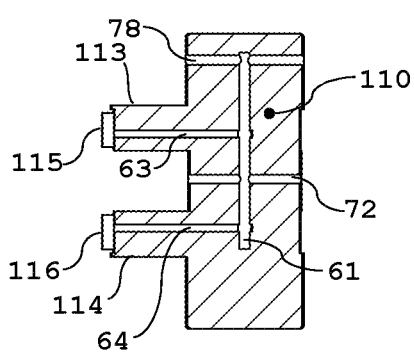
Figure 9A:
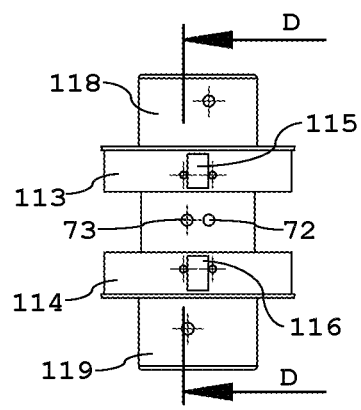
FIG. 9A shows again top view of the first embodiment crankpin, while D-D denotes another cross section depicted in FIG. 9B, parallel to those C-C cross section.
Figure 9B:
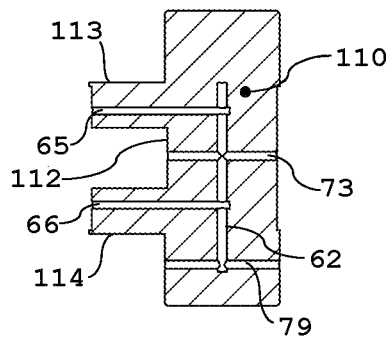

The cross-section A-A denoted in FIG. 6A is depicted in FIG. 6B and it is clearly visible how longitudinal channels (61, 62) can spread. All lateral channels can be in contact with only one longitudinal channel (61, 62), but may never be in contact with both, according to one or more embodiments of the present disclosure. The cross-section C-C denoted in FIG. 8A is depicted in FIG. 8B and shows all lateral channels (63, 64, 72, 78) which can be in direct contact with longitudinal channel (61). Similarly, the cross-section D-D denoted in FIG. 9A is depicted in FIG. 9B and shows all lateral channels (65, 66, 73, 79) which can be in direct contact with longitudinal channel (62). Moreover, the cross-section B-B denoted in FIG. 7A is depicted in FIG. 7B and shows how the channels (61, 62) can be connected to the corresponding lateral channels (64, 66) arranged to the end on the left off-axial crankpin journal (114) surface, close to the left delimiter (116). In the same manner, the channels (61, 62) can be connected to the corresponding lateral channels (63, 65) arranged to the end on the right off-axial crankpin journal (113) surface, close to the right delimiter (115).

The channel (78), made across the right pin (118), FIG. 8B, can feed the oil into the longitudinal channel (61) which can further distribute the oil to the channel (72) made across the crankpin journal (112) for the lubrication purposes of big end bearing (22), and to the lateral channels (63, 64) for compression adjustment. The channel (79), made across the left pin (119), FIG. 9B, can feed the oil into the longitudinal channel (62) which can further distribute the oil to the channel (73) made across the crankpin journal (112) for the lubrication purposes of big end bearing (22), and to the lateral channels (65, 66) for compression adjustment.

According to one or more embodiments of the present disclosure, the crankshaft can be composed or consist of one segment depicted in FIG. 4 which can comprise or consist of the adjustable crankpin (110), accompanied by left and right counterweights (80, 90), and the corresponding main journals (89, 99) connected thereto. The oil channels (C1, C2) can extend across the main journals (89, 99) and end both in the corresponding pin nests (81, 91) at the position that is suitable to transmit the oil pressure. Each channel (C1, C2) can supply the oil in the corresponding channel (79, 78), such as depicted in FIGS. 12A-12F and FIGS. 13A-13F, though embodiments of the disclosed subject matter are not so limited to this way of supplying the oil.

Notably regarding embodiments of the disclosure subject matter, for instance, with respect to the second technical problem, is construction of a C-shaped segment (120) and a driving segment (130); examples of the C-shaped segment (120) and the driving segment (130) are shown in FIGS. 10A-10E and FIGS. 11A-11E respectively. Together they can form the segmented eccentric ring, such as shown in FIGS. 12E and 13E.

The C-shaped segment (120) can have snap connectors (123) formed at both ends and can receive the snap connectors (132) made on the driving segment (130). Furthermore, the C-shaped segment (120) can be equipped with the oil channels (124), such as shown in FIGS. 10E and 10B, which can drain the oil out of the segmented eccentric ring. Similarly, the driving segment (130), beside the mentioned snap connectors (132) compatible with the equivalent snap connectors (132), can also have oil channels (134) to facilitate the draining of the oil out of the segmented eccentric ring. The segmented eccentric ring can be made of two parts to enable fastening over the right and the left off-axial crankpin journals (113, 114) to make the construction depicted in FIGS. 12D, 13D, for instance. Once the C-shaped segment (120) and the driving segment (130) are connected via the corresponding snap connectors around the desired off-axial crankpin journals (113, 114), the construction can be nested within the corresponding bearing space (31, 41) made within the corresponding auxiliary connecting rod (30, 40). An outer surface of the segmented eccentric ring can be circular and smooth, for instance. The segmented eccentric ring can fits perfectly within the desired bearing space (31, 41).

The compression ratio can be changed by the process described in FIGS. 12A-12F and 13A-13F, for instance. The oil reservoir (150) can be usually the oil situated in the engine oil pan. The oil pump (140) can pump the oil via the oil channels (C1, C2), which can be regulated by the valves (141, 142). If the valve (142) is closed and the valve (141) is open, the oil pump can be pumping the oil in the oil channel (C1), and vice versa. When the oil is pumped in the oil channel (C1), the pressurised oil can enter the lateral channel (79), FIG. 12B, and can run across the longitudinal channel (62), such as in FIGS. 12C, 12B, and can finally go out from lateral channels (66, 65, 73). Equally, when the oil is pumped in the oil channel (C2), the pressurised oil can enter the lateral channel (78), such as in FIG. 13B, and can run across the longitudinal channel (61), FIGS. 13C, 13B, and can finally go out from lateral channels (64, 63, 72).

Figure 12A:
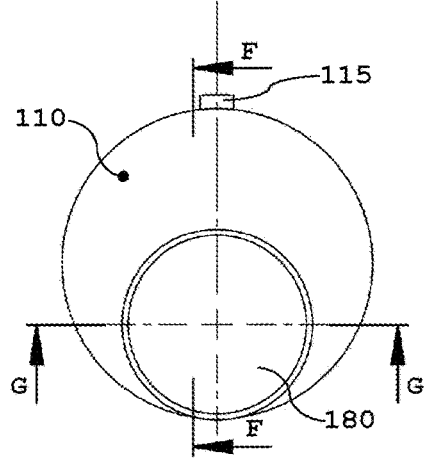
FIGS. 12A-12F show the first embodiment method for changing the compression ratio by rotating the C-shaped segment and driving segment over the off-axial crankpin journal, by applying the oil pressure across the C1 channel.
Figure 12B:
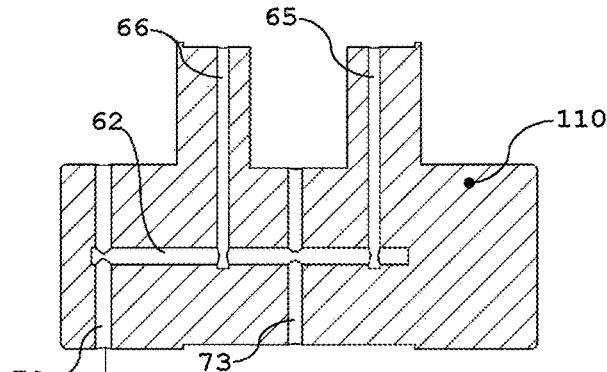
Figure 12C:
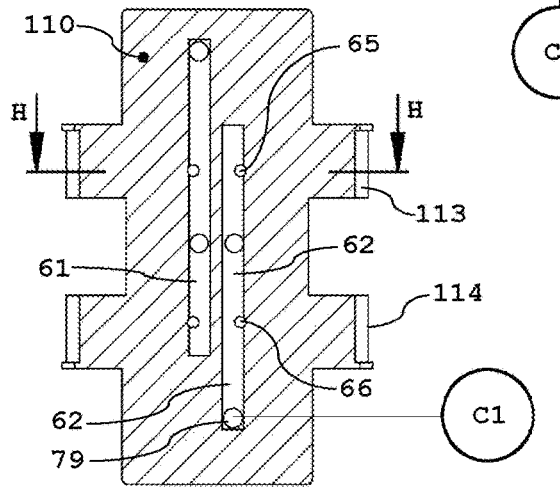
Figure 12D:
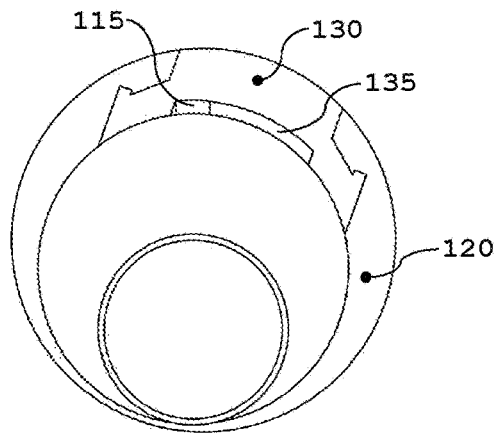
Figure 12E:
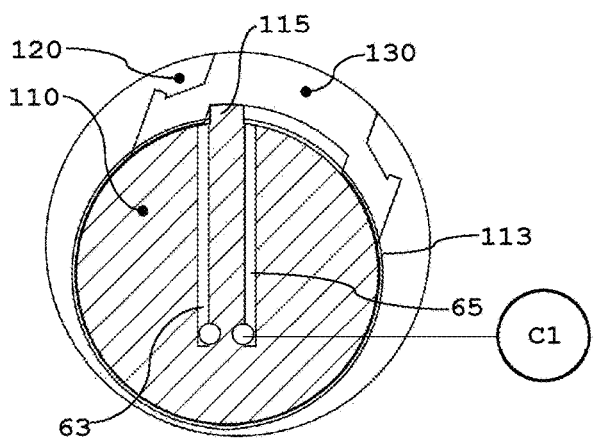
Figure 12F:
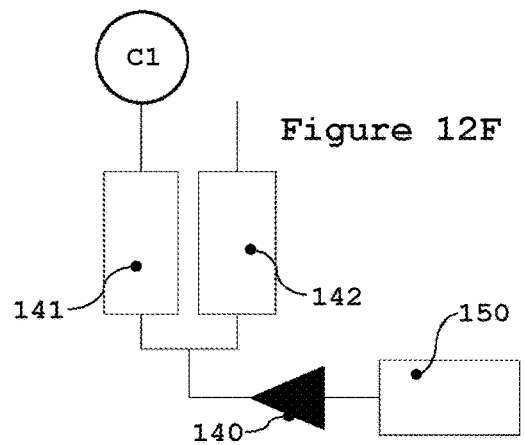

Two different positions of the segmented eccentric ring rotated over the right off-axial crankpin journal (113) are depicted in FIGS. 12E, 13E and in FIGS. 12D, 13D, where the segmented eccentric ring can be composed from or consist of the C-shaped segment (120) and the driving element (130). Starting from the situation depicted in FIG. 12E, for instance, and imagining that the oil pressure is suddenly pumped to the channel (C2), see the FIG. 13E, the later action which can pump the oil in the lateral channel (63). The oil can start to enter the space between the end of the oil channel (63) and the left side of the delimiter (115), FIG. 13E, and into the expansion space (135), such as depicted in FIG. 13D. The later can perform the rotation of the entire segmented eccentric ring into position finally depicted in FIG. 13E. Once the oil channel (134), made across the driving segment (130) passes the delimiter (115), the oil from the expansion space (135) can leak out across the channel (134), FIG. 11C, and preserve the segmented eccentric ring in the desired position.

Similarly, if the oil is pumped to the channel (C1) the resulting effect can be transition from the state, for instance, as depicted in FIGS. 13E, 13D into a final state, such as depicted in FIGS. 12E, 12D.

Figure 14:
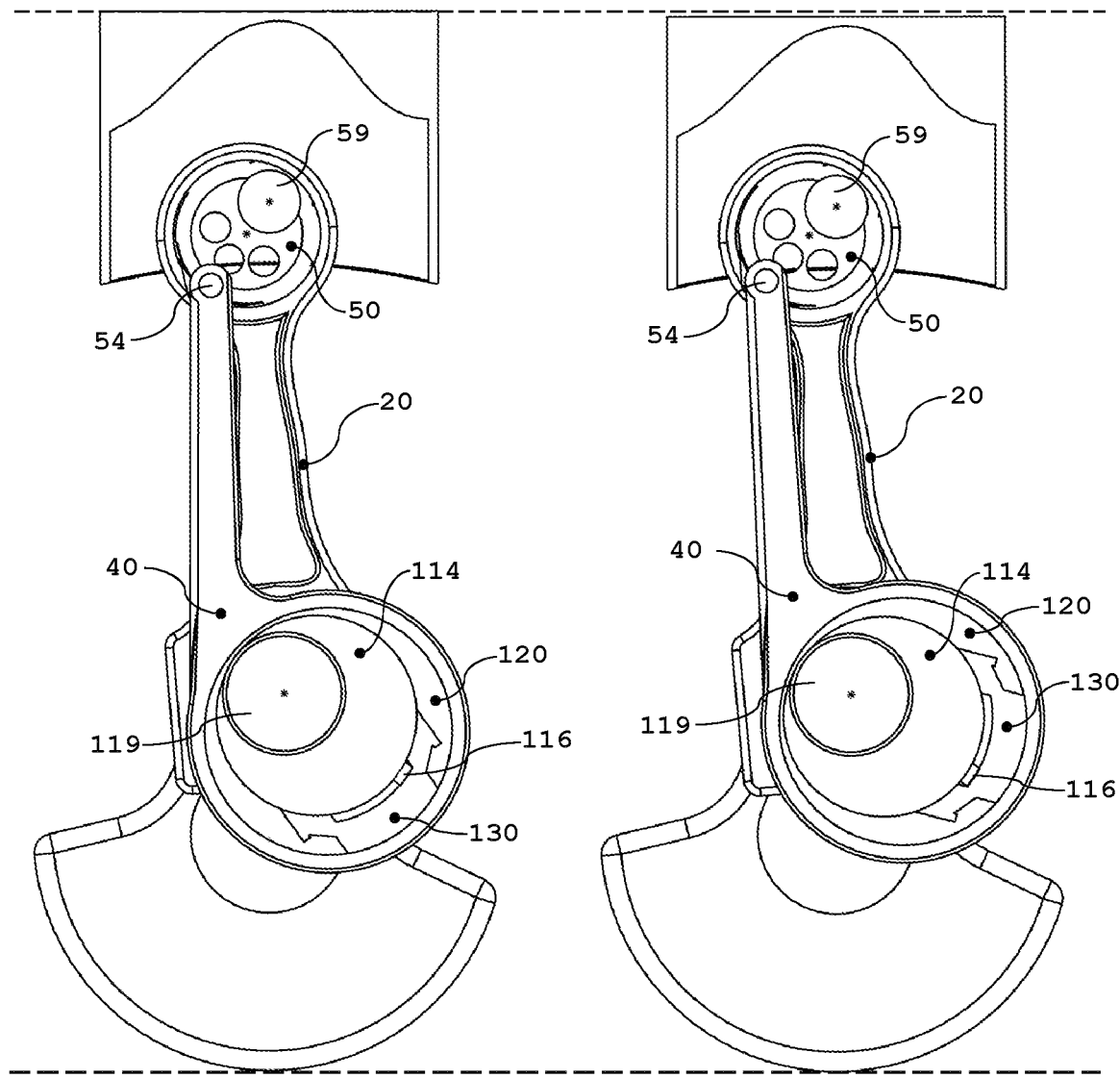
FIG. 14 shows the actual variation in compression ratio by rotating the C-shaped segment and the corresponding driving segment over the off-axial crankpin journal. Two positions are depicted.

The ability that the segmented eccentric rings can rotate about the corresponding off-axial crankpin journals (113, 114) in desired manner, can have further implication to the compression rates, see FIG. 14 which depicts different situations in TDC corresponding to the segmented eccentric ring's position. The change of its position can modify the top dead centre sliding pin (53, 54) offset position within the small end bore (25) due to the mechanical connection of the segmented eccentric ring and the corresponding sliding pin (53, 54). A change of the sliding pin (53, 54) offset position can also modify the TDC piston pin bore (59) offset position within the main connecting rod (20), which can change the compression ratio of the internal combustion engine. Here, it is noted that even small changes of the sliding pin (53, 54) offset position can affect the TDC piston pin bore (59) enough to change the compression rate.

Finally, it should be noted that in one or more embodiments of the present disclosure, two off-axial crankpin journals (113, 114; 13, 14) can be present, such as depicted in FIG. 4 and FIG. 1, for instance, in order to distribute exerted forces to the upper crankpin (50) evenly, where the crankpin journal (112; 12) can be situated between the off-axial crankpin journals (113, 114; 13, 14). Optionally, one or more embodiments of the disclosed subject matter can be directed solely to the solution of the first technical problem, for instance, without ability to change the compression ratio. In such embodiment, the crankpin (10) can be nested by the pair of pins (18, 19) into the counterweights (80, 90) associated with the respective main journals (89, 99). The auxiliary connecting rods (30, 40) can be again pivotably fastened via its corresponding bearing to one or more off-axial crankpin journals (113, 114), without intermediate segmented eccentric rings. The latter may prevent the change of compression ratio. However, the auxiliary connecting rods (30, 40) can still continuously modify the piston pin bore distance relative to the crankpin journal central axis during its rotation in each stroke of the internal combustion engine.

In one variant of the second embodiment, two auxiliary connecting rods (30, 40) can be linked with the crankpin (10) together with the main connecting rod (20) situated between the auxiliary connecting rods (30, 40) in order to distribute forces to the upper crankpin (50) evenly.

INDUSTRIAL APPLICABILITY

One or more embodiments of the disclosed subject matter can have the ability to modify the piston pin bore (59) distance relative to the main journals (89, 99) central axis during their rotation, which can improve the internal combustion stroke-to-stroke performance. One or more embodiments of the disclosed subject matter can additionally or alternatively adjust the compression ratio, by hydraulics, for instance, acting on the entire segmented eccentric ring (120, 130) relative position within the connecting rod bearing space (31, 41) via adjustable crankpin (110) oil channels.

REFERENCE NUMBERS

10—crankpin
12—crankpin journal
13—right off-axial crankpin journal
14—left off-axial crankpin journal
18—right pin
19—left pin
20—main connecting rod
21—big end bore
22—big end bearing
25—small end bore
26—small end bearing
30—right auxiliary connecting rod
31—bearing space
32—connecting rod bearing
35—pin bearing
40—left auxiliary connecting rod
41—bearing space
42—connecting rod bearing
45—pin bearing
50—upper crankpin
56—upper crankpin journal
53—left sliding pin
54—right sliding pin
59—piston pin bore 61—first longitudinal oil channel
62—second longitudinal oil channel
63—right delimiter first lateral oil channel
64—left delimiter first lateral oil channel
65—right delimiter second lateral oil channel
66—left delimiter second lateral oil channel
78—oil channel through right pin 118
72—right bore through crankpin journal 112
73—left bore through crankpin journal 112
79—oil channel through left pin 119
80—right counterweight
81—right pin nest
82—right pin receiving surface
89—main journal
90—left counterweight
91—left pin nest
92—left pin receiving surface
99—main journal
110—adjustable crankpin
112—crankpin journal
113—right off-axial crankpin journal
114—left off-axial crankpin journal
115—right delimiter
116—left delimiter
118—right pin
119—left pin
120—C-shaped segment
123—snap connector, for receiving driving segment 130
124—oil channel
130—driving segment
132—snap connector, for inserting into C-shaped segment
134—oil channel
135—expansion space
140—oil pump
141—valve for channel C1
142—valve for channel C2
150—oil reservoir
α,α'—offset angle

The invention claimed is:

1. A piston-crankshaft connector for an internal combustion engine, consisting of:
a crankpin nested, via a pair of pins of the crankpin, into counterweights associated with respective main journals;
a main connecting rod;
at least one auxiliary connecting rod; and
an upper crankpin, wherein
the crankpin is further equipped with an axially positioned crankpin journal to which the main connecting rod is pivotably attached with a big end bore thereof, where the crankpin has one or more off-axial crankpin journals to which the at least one auxiliary connecting rod is pivotably fastened via a corresponding at least one bearing,
the upper crankpin is nested within a small end bore formed in the main connecting rod and forms a sliding bearing with the small end bore, the upper crankpin is equipped with an off-center piston pin bore and at least one sliding pin which is positioned a predetermined distance from the upper crankpin rim to which the at least one auxiliary connecting rod is pivotably fastened, where the at least one auxiliary connecting rod continuously modifies a piston pin bore distance relative to a crankpin journal central axis during its rotation in each stroke of the internal combustion engine,
where the at least one auxiliary connecting rod continuously modifies the piston pin bore distance relative to the crankpin journal central axis during its rotation in each stroke of the internal combustion engine.

2. The piston-crankshaft connector for the internal combustion engine according to the claim 1, wherein the at least one auxiliary connecting rod includes two auxiliary connecting rods linked with the crankpin together with the main connecting rod between the auxiliary connecting rods to distribute exerted forces to the upper crankpin evenly.

3. The piston-crankshaft connector for the internal combustion engine according to the claim 1, wherein
the crankpin and the main journals being equipped with the plurality of oil channels,
each at least one auxiliary connecting rod is equipped with a segmented eccentric ring,
the crankpin is further equipped with at least one delimiter formed as a tooth on at least one off-axial crankpin journal, where at least a pair of oil channels extend from a crankpin interior to an off-axial crankpin journal outer surface such that the pair of oil channels ends a predefined distance from the at least one delimiters, where the at least one delimiter is beneath a driving segment of the segmented eccentric ring which is composed from a C-shaped segment and the driving segment, where oil pressure exerted in one or more of the oil channels rotates the segmented eccentric ring over the corresponding off-axial crankpin journals and modifies the top dead center sliding pin position within the small end bore which simultaneously modifies the piston pin bore position within the main connecting rod and changes a compression ratio of the internal combustion engine.

4. A piston-crankshaft connector for an internal combustion engine, consisting of:
a crankpin nested, via a pair of pins of the crankpin, into counterweights associated with respective main journals, the crankpin and the main journals being equipped with the plurality of oil channels;
a main connecting rod;
at least one auxiliary connecting rod, each equipped with a segmented eccentric ring; and
an upper crankpin, wherein
the crankpin is further equipped with an axially positioned crankpin journal to which the main connecting rod is pivotably attached with a big end bore thereof, where the crankpin has one or more off-axial crankpin journals to which the at least one auxiliary connecting rod is pivotably fastened via a corresponding at least one bearing,
the upper crankpin is nested within a small end bore formed in the main connecting rod and forms a sliding bearing with the small end bore, the upper crankpin is equipped with an off-center piston pin bore and at least one sliding pin which is positioned a predetermined distance from the upper crankpin rim to which the at least one auxiliary connecting rod is pivotably fastened, where the at least one auxiliary connecting rod continuously modifies a piston pin bore distance relative to a crankpin journal central axis during its rotation in each stroke of the internal combustion engine, and
where the crankpin is further equipped with at least one delimiter formed as a tooth on at least one off-axial crankpin journal, where at least a pair of oil channels extend from a crankpin interior to an off-axial crankpin journal outer surface such that the pair of oil channels ends a predefined distance from the at least one delimiters, where the at least one delimiter is beneath a driving segment of the segmented eccentric ring which is composed from a C-shaped segment and the driving segment, where oil pressure exerted in one or more of the oil channels rotates the segmented eccentric ring over the corresponding off-axial crankpin journals and modifies the top dead center sliding pin position within the small end bore which simultaneously modifies the piston pin bore position within the main connecting rod and changes a compression ratio of the internal combustion engine.

5. The piston-crankshaft connector for the internal combustion engine according to the claim 4, wherein the at least one auxiliary connecting rod includes two auxiliary connecting rods linked with the crankpin together with the main connecting rod between the auxiliary connecting rods to distribute exerted forces to the upper crankpin evenly.

6. The piston-crankshaft connector for the internal combustion engine according to claim 4, wherein the segmented eccentric ring is composed of the C-shaped segment and the driving segment, both equipped with the oil channels and mutually connected via snap connectors formed at their respective ends.

7. A method for regulating compression ratio for an internal combustion engine using a piston-crankshaft connector, wherein the piston-crankshaft connector includes:
a crankpin nested, via a pair of pins of the crankpin, into counterweights associated with respective main journals, the crankpin and the main journals being equipped with the plurality of oil channels,
a main connecting rod,
at least one auxiliary connecting rod, each equipped with a segmented eccentric ring, and
an upper crankpin,
wherein the crankpin is further equipped with an axially positioned crankpin journal to which the main connecting rod is pivotably attached with a big end bore thereof, where the crankpin has one or more off-axial crankpin journals to which the at least one auxiliary connecting rod is pivotably fastened via a corresponding at least one bearing,
wherein the upper crankpin is nested within a small end bore formed in the main connecting rod and forms a sliding bearing with the small end bore, the upper crankpin is equipped with an off-center piston pin bore and at least one sliding pin which is positioned a predetermined distance from the upper crankpin rim to which the at least one auxiliary connecting rod is pivotally fastened, where the at least one auxiliary connecting rod continuously modifies a piston pin bore distance relative to a crankpin journal central axis during its rotation in each stroke of the internal combustion engine,
wherein the crankpin is further equipped with at least one delimiter formed as a tooth on at least one off-axial crankpin journal, where at least a pair of oil channels extend from a crankpin interior to an off-axial crankpin journal outer surface such that the pair of oil channels ends a predefined distance from the at least one delimiter, where the at least one delimiter is beneath a driving segment of the segmented eccentric ring which is composed from a C-shaped segment and the driving segment, where oil pressure exerted in one or more of the oil channels rotates the segmented eccentric ring over the corresponding off-axial crankpin journals and modifies the top dead center sliding pin position within the small end bore which simultaneously modifies the piston pin bore position within the main connecting rod and changes a compression ratio of the internal combustion engine, and
wherein the method comprises:
pumping, using an oil pump, oil from an oil reservoir through one of two oil channels made through a crankshaft, where the channel pair extends through each of the main journals and each said crankpin forming two longitudinal channels, including a first longitudinal channel and a second longitudinal channel;
transmitting the oil at pressure exerted by the pump by a first group of lateral oil channels connected to the first longitudinal channel or by a second group of lateral oil channels connected to the second longitudinal channel, each of the first and second groups of lateral oil channels ending on an off-axial crankpin surface within the predefined distance from the corresponding delimiter side, wherein each delimiter divides an expansion space formed beneath the driving segment; and
after the transmitting, injecting oil into the expansion space, via one group of channels to rotate the entire segmented eccentric ring relative over the off-axial crankpin's outer surface in a desired direction to modify at least one top dead center sliding pin position within the small end bore and simultaneously modify the piston pin bore position within the main connecting rod and change the compression ratio of the internal combustion engine.

* * * * *